US012761759B2

(12) United States Patent
Chang et al.

(10) Patent No.: US 12,761,759 B2
(45) Date of Patent: Oct. 13, 2026

(54) TOUCH SYSTEM

(71) Applicant: Himax Technologies Limited, Tainan City (TW)

(72) Inventors: Yaw-Guang Chang, Tainan City (TW); Chang-Hui Lin, Tainan City (TW)

(73) Assignee: Himax Technologies Limited, Tainan City (TW)

( * ) Notice: Subject to any disclaimer, the term of this patent is extended or adjusted under 35 U.S.C. 154(b) by 0 days.

(21) Appl. No.: 19/098,849

(22) Filed: Apr. 2, 2025

(65) Prior Publication Data

US 2026/0310323 A1 Oct. 8, 2026

(51) Int. Cl.
*G06F 3/044* (2006.01)
*G06F 3/041* (2006.01)

(52) U.S. Cl.
CPC ........ *G06F 3/0442* (2019.05); *G06F 3/04162* (2019.05)

(58) Field of Classification Search
CPC ........................... G06F 3/0442; G06F 3/04162
See application file for complete search history.

(56) References Cited

U.S. PATENT DOCUMENTS 5,138,118 A * 8/1992 Russell .................. G06F 3/046 178/19.03
5,896,306 A * 4/1999 Aschwanden .... H04L 25/03133 375/350
6,111,919 A * 8/2000 Yonge, III .......... H04L 27/2662 370/480
7,809,078 B2 * 10/2010 Hori .................... H04L 27/2614 375/295
8,295,381 B2 * 10/2012 Mohammed ...... H04L 25/03006 375/267
8,457,975 B2 * 6/2013 Neuendorf ............. G10L 19/20 375/240
9,479,272 B2 * 10/2016 Bae ................... H04L 25/03821
10,209,827 B1 * 2/2019 Malkin ................. G06F 3/0418
10,474,277 B2 * 11/2019 Pant ...................... G06F 3/0446
2004/0095333 A1 * 5/2004 Morag .................... G06F 3/046 345/173
2014/0267071 A1 * 9/2014 Shahparnia ........... G06F 3/0442 345/173
2014/0307810 A1 * 10/2014 Batra ................ H04L 27/26265 375/295
2016/0018921 A1 * 1/2016 Matlick ............... G06F 3/04162 345/174
2017/0108963 A1 * 4/2017 Mao .................... G06F 3/03545
2017/0235384 A1 * 8/2017 Fleck .................... G06F 3/0414 345/174
2022/0137778 A1 * 5/2022 Hisano .................. G06F 1/1647 345/179
2022/0353119 A1 * 11/2022 Putra ....................... G06F 3/044
2023/0280843 A1 * 9/2023 Chang ................... G06F 3/0441 345/179
2024/0097717 A1 * 3/2024 Dao ....................... H01Q 5/307
2025/0026015 A1 * 1/2025 Svensson ............... B25J 9/1671

* cited by examiner

*Primary Examiner* — Jeff Piziali
(74) *Attorney, Agent, or Firm* — Donald E. Stout; Stout, Uxa & Buyan, LLP

(57) ABSTRACT

A touch system includes a stylus that generates a touch sensing signal, the stylus including a shaping device that sequentially shapes raw signals by only half of a window function a time, thereby generating a windowed signal as the touch sensing signal; and a touch screen coupled to receive the touch sensing signal.

12 Claims, 7 Drawing Sheets

TOUCH SYSTEM

BACKGROUND OF THE INVENTION

1. Field of the Invention

The present invention generally relates to a touch system, and more particularly to a touch system capable of substantially reducing electromagnetic interference.

2. Description of Related Art

A stylus and touch system is an integrated technology that allows users to interact with touch-sensitive devices using a stylus. This system combines the precision of a stylus with the versatility of a touch screen, enabling a wide range of applications, from drawing and writing to navigation and control.

Stylus is a pen-like device used to interact with the touch screen, and may be active (with electronic components) or passive (without electronic components). Active styluses often include features like pressure sensitivity, tilt detection, and buttons for additional functionality.

The touch screen is a display that can detect touch input from a stylus. The touch screen can adopt various technologies, such as capacitive, resistive, or optical touch sensing. Capacitive touch screens are commonly used in modern devices due to their accuracy and responsiveness.

Styluses offer more precise input compared to fingers, making them ideal for tasks that require accuracy. Combining a stylus with a touch screen allows for a wide range of interactions, from simple taps to complex gestures.

However, electromagnetic interference (EMI) can significantly impact the performance of a stylus and touch system. Devices like high-frequency equipment, large motors, and radio transmitters generate electromagnetic fields that can interfere with the touch screen. Changes in current within power lines can produce electromagnetic radiation, especially if the lines are not well-shielded. Mobile phones, Wi-Fi routers, and other wireless devices emit electromagnetic radiation that can interfere with touch screens. Capacitive touch screens, which use human capacitance to sense touch positions, are particularly susceptible to external electromagnetic fields. External EMI can couple with the touch screen device through capacitance, causing abnormal operation and affecting touch sensitivity and accuracy.

For the foregoing reasons, a need has thus arisen to propose a novel scheme to mitigate EMI for ensuring the reliable performance of stylus and touch systems.

SUMMARY OF THE INVENTION

In view of the foregoing, it is an object of the embodiment of the present invention to provide a touch system capable of substantially reducing electromagnetic interference.

According to one embodiment, a touch system includes a stylus and a touch screen. The stylus generates a touch sensing signal and includes a shaping device that sequentially shapes raw signals by only half of a window function a time, thereby generating a windowed signal as the touch sensing signal. The touch screen is coupled to receive the touch sensing signal.

DETAILED DESCRIPTION OF THE INVENTION

Figure 1:
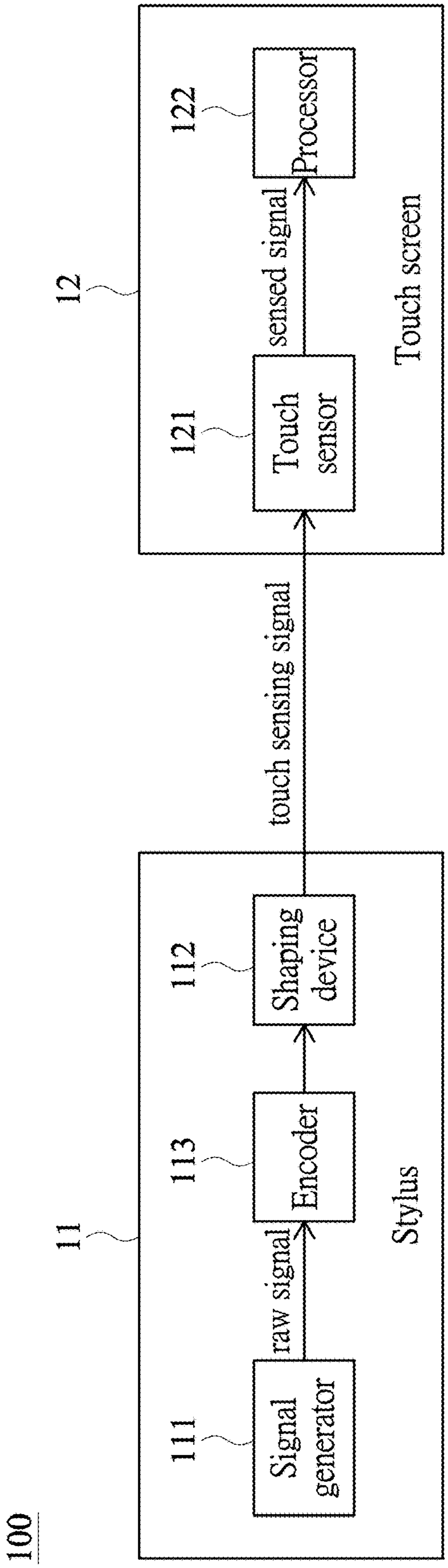
FIG. 1 shows a block diagram illustrating a touch system capable of substantially reducing electromagnetic interference according to one embodiment of the present invention.

FIG. 1 shows a block diagram illustrating a touch system 100 capable of substantially electromagnetic interference according g to one embodiment of the present invention.

The touch system 100 of the embodiment may include a stylus 11 (such as an active capacitive stylus) and a touch screen 12 (such as a capacitive touch screen). The stylus 11 may transmit a touch sensing signal to the touch screen 12. In the embodiment, the touch sensing signal may include a positioning signal for determining a touch position of the stylus 11 on the touch screen 12, allowing a user to interact accurately with the touch screen 12. The touch sensing signal may further include an encoding signal for transmitting features (e.g., pressure applied by the stylus 11, angle of the stylus 11, or specific commands) from the stylus 11 to the touch screen 12. By using the positioning and encoding signals, the stylus 11 can provide a rich and interactive experience, allowing for more precise input and additional features like pressure sensitivity and gesture recognition. It is noted that the touch system 100 may operate in either mutual mode sensing or self mode sensing.

Specifically, the stylus 11 may include a signal generator 111 configured to generate a raw signal such as sinusoidal signal. The stylus 11 of the embodiment may include a shaping device 112 configured to apply a window function (e.g., Hamming, Hanning or Blackman window) on the raw signal to reduce electromagnetic interference from radio frequency (RF) signals with frequencies neighboring the raw signal, thereby generating a windowed signal (e.g., windowed sinusoidal signal) as the touch sensing signal. The touch screen 12 of the embodiment may include touch sensors 121 coupled to receive touch sensing signals, thereby generating sensed signals respectively. The touch screen 12 of the embodiment may include a processor 122 configured to determine the touch position and features (e.g., pressure applied by the stylus 11, angle of the stylus 11, or specific commands) according to the sensed signals.

Figure 2A:
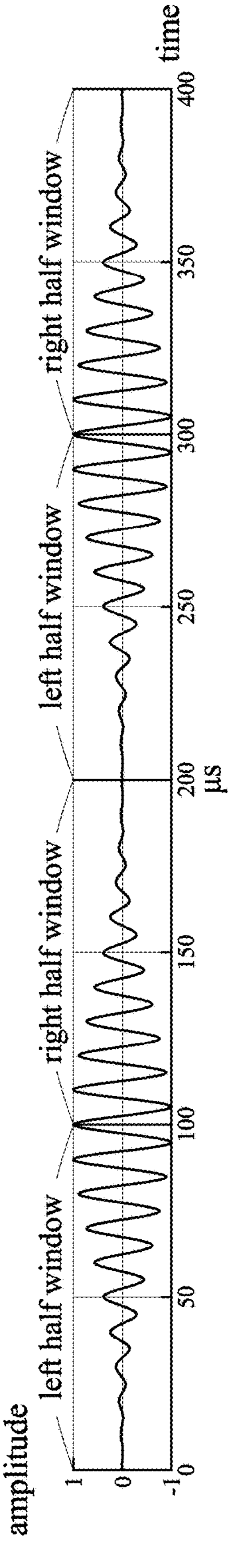
FIG. 2A exemplifies a sequence of four raw (sinusoidal) signals that are sequentially shaped by left half of the window function and right half of the window function alternately.
Figure 2B:
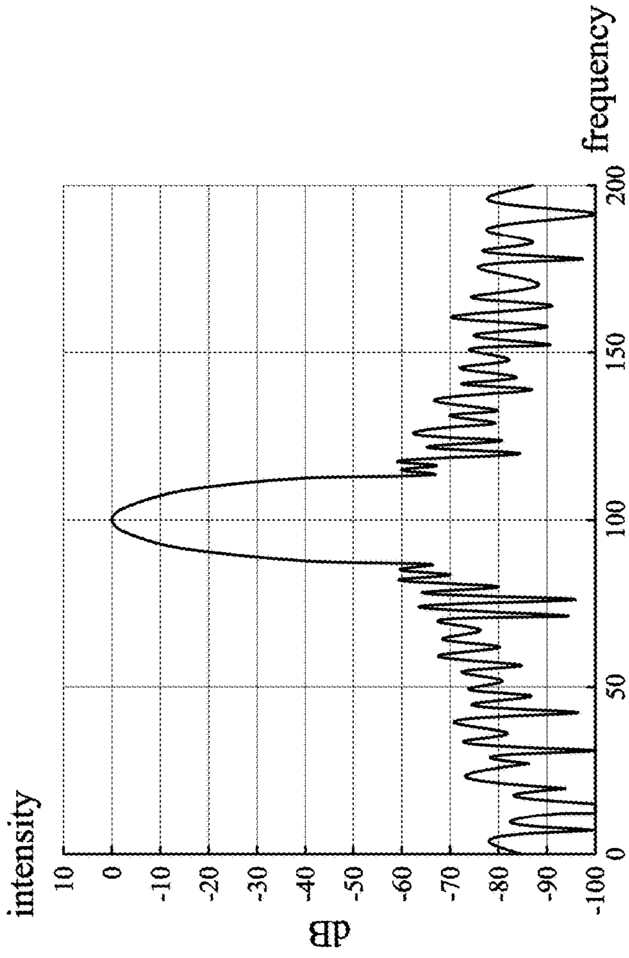
FIG. 2B shows a frequency spectrum of the windowed signal of FIG. 2A.

According to one aspect of the embodiment, raw signals are sequentially shaped by only half of the window function (instead of an entire window function), and are sequentially shaped by left half of the window function (that tapers left-hand edge of the raw signal) and right half of the window function (that tapers right-hand edge of the raw signal) alternately, thereby resulting in multiple segmented continuous periodic signals. FIG. 2A exemplifies a sequence of four raw (sinusoidal) signals that are sequentially shaped by left half of the window function and right half of the window function alternately. As shown in FIG. 2A, the first raw signal is shaped by left half of the window function between 0 and 100 μs and the second raw signal is shaped by right half of the window function between 100 and 200 μs. It is noted that the left half of the window function shaping the first raw signal and the right half of the window function shaping the second raw signal form an entire window function with a width being twice a duration of each raw signal. FIG. 2B shows a frequency spectrum of the windowed signal of FIG. 2A. The frequency spectrum shows the distribution of energy or strength across frequencies for the windowed signal, with the x-axis representing frequency, and the y-axis representing the intensity of each frequency. As exemplified in FIG. 2B, electromagnetic interference below 85 kHz or above 115 kHz can be substantially reduced.

Figure 3A:
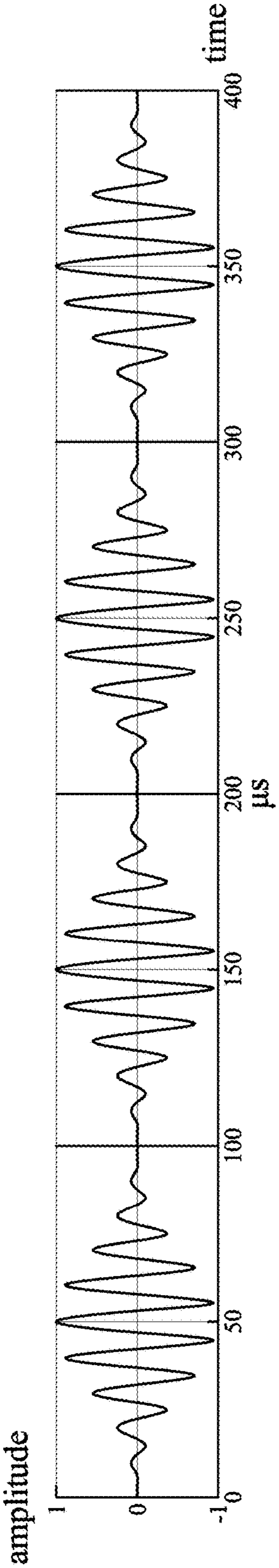
FIG. 3A shows a sequence of four raw (sinusoidal) signals that are each sequentially shaped by entire window function.
Figure 3B:
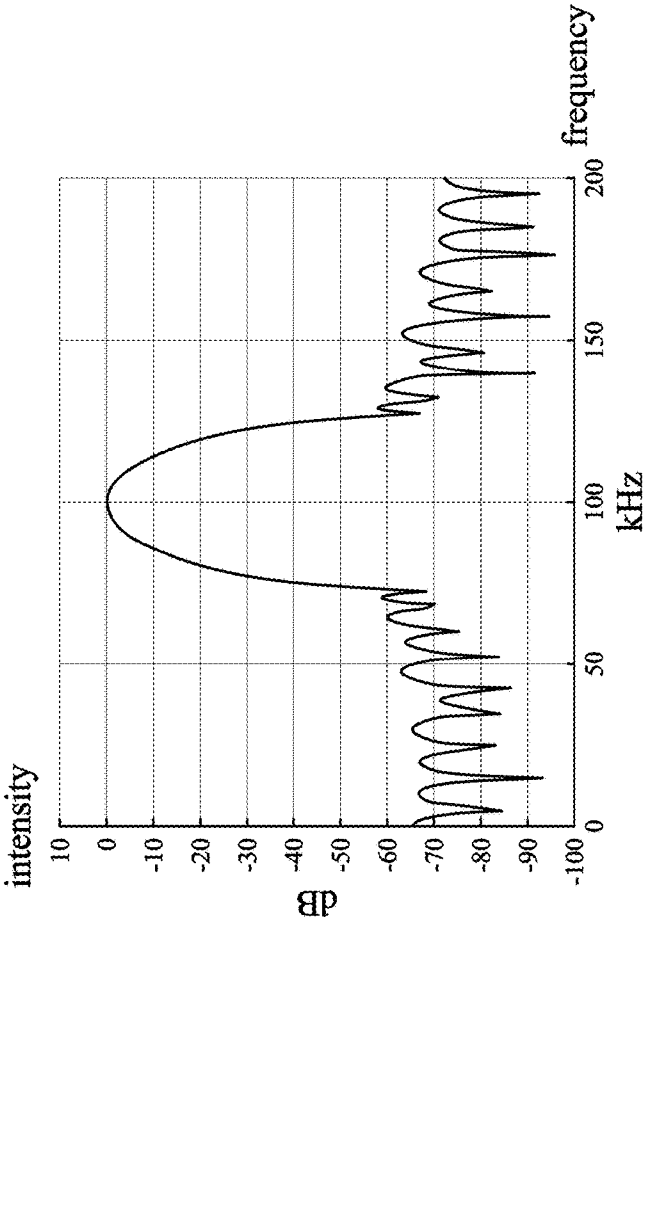
FIG. 3B shows a frequency spectrum of the windowed signal of FIG. 3A.

FIG. 3A shows a sequence of four raw (sinusoidal) signals that are each sequentially shaped by entire window function (instead of only half of the window function as in FIG. 2A). FIG. 3B shows a frequency spectrum of the windowed signal of FIG. 3A. As exemplified in FIG. 3B, electromagnetic interference below 70 kHz or above 130 kHz can be reduced. It is apparent that the interference reduction effect of FIG. 3B is much worse than that of FIG. 2B.

Figure 4:
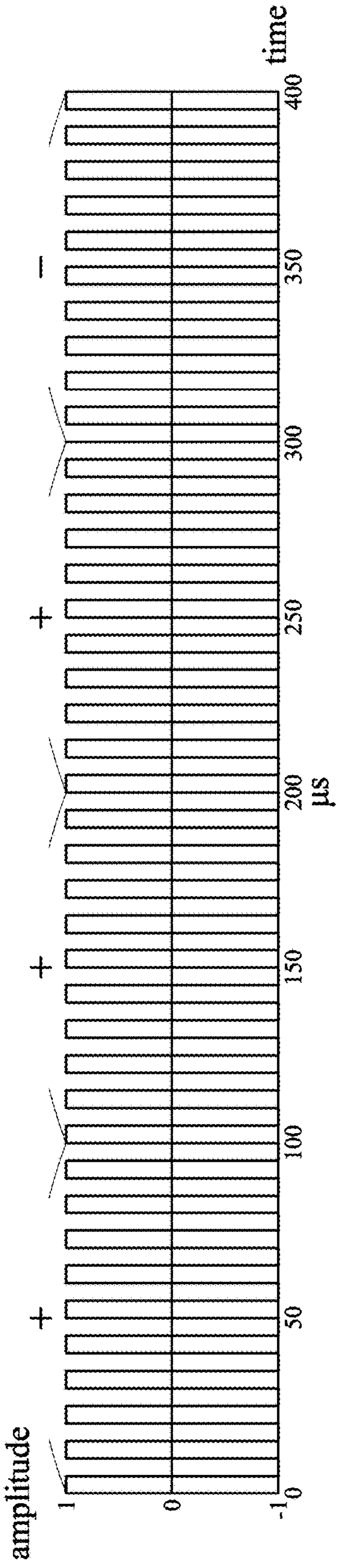
FIG. 4 exemplifies sequentially transmitting raw signals encoded as [+1 +1 +1 −1] by the encoder of the stylus of FIG. 1.

In the embodiment, the stylus 11 may further include an encoder 113 configured to encode a sequence of raw signals, for example, by phase shift keying (PSK) such as binary phase shift keying (BPSK) method. FIG. 4 exemplifies sequentially transmitting raw signals encoded as [+1 +1 +1 −1] by the encoder 113 of the stylus 11 of FIG. 1.

According to another aspect of the embodiment, the processor 122 of the touch screen 12 is configured to determine a frequency at which the touch sensing signal is received (from the stylus 11) and then decoded according to an amplitude frequency response, showing how the amplitude of output signals changes with input frequencies. The amplitude frequency response plots the amplitude or gain (vertical axis) against the frequency (horizontal axis), generally helps in identifying a range of frequencies over which the touch system 100 operates effectively and highlights any frequencies that may cause distortion or attenuation. Specifically, the processor 122 utilizes the amplitude frequency response to determine optimal frequencies for touch sensing signal transmission and reception, ensuring that the processor 122 accurately detects and processes the sensed signals without interference from neighboring frequencies.

Figure 5:
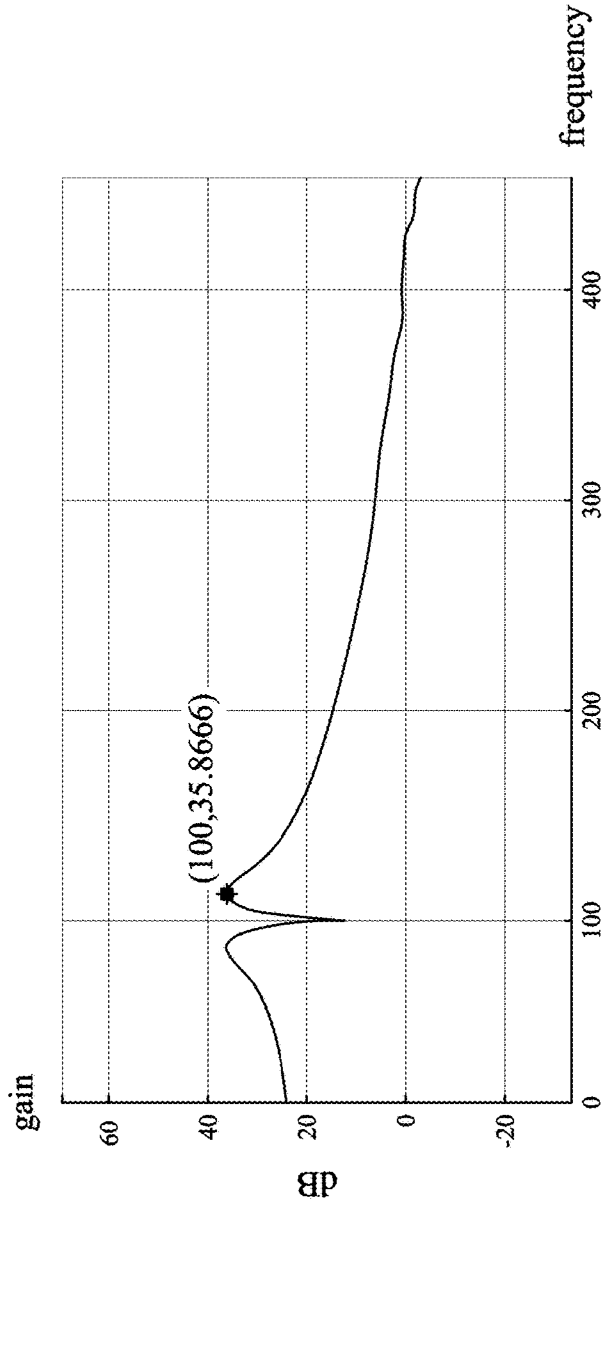
FIG. 5 shows an exemplary amplitude frequency response.
Figure 6B:
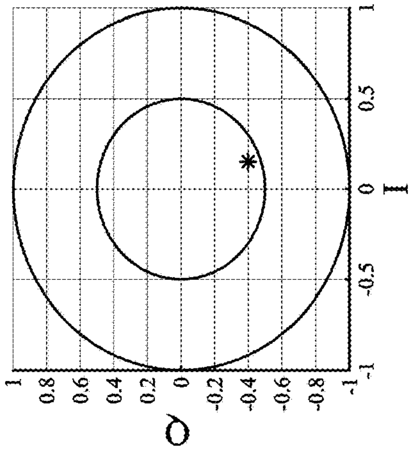
FIG. 6B shows IQ plot of the signals of FIG. 6A.
Figure 6A:
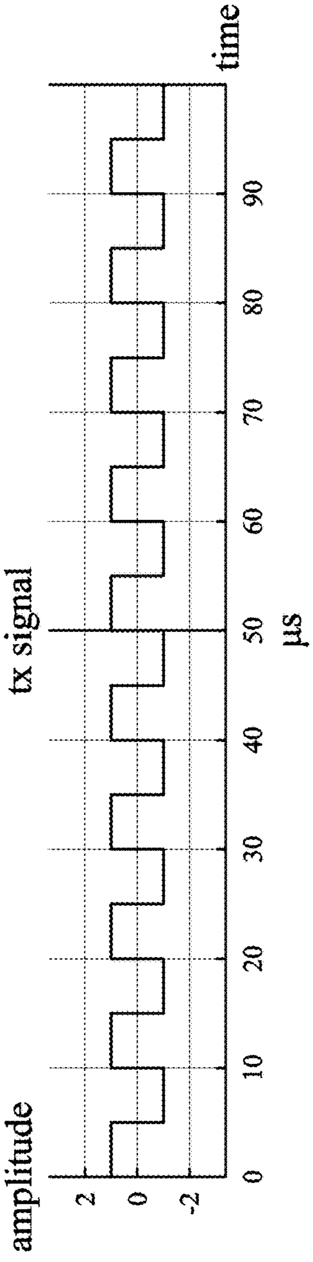
FIG. 6A exemplifies transmitting in-phase ++ signals.
Figure 7B:
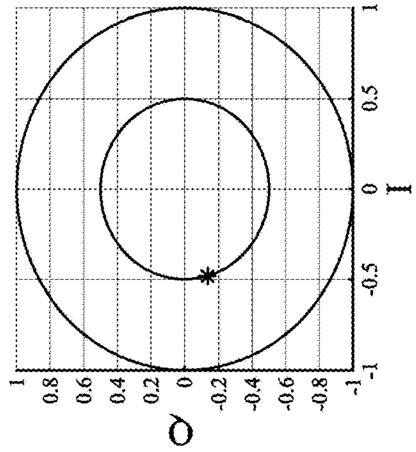
FIG. 7B shows IQ plot of the signals of FIG. 7A.
Figure 7A:
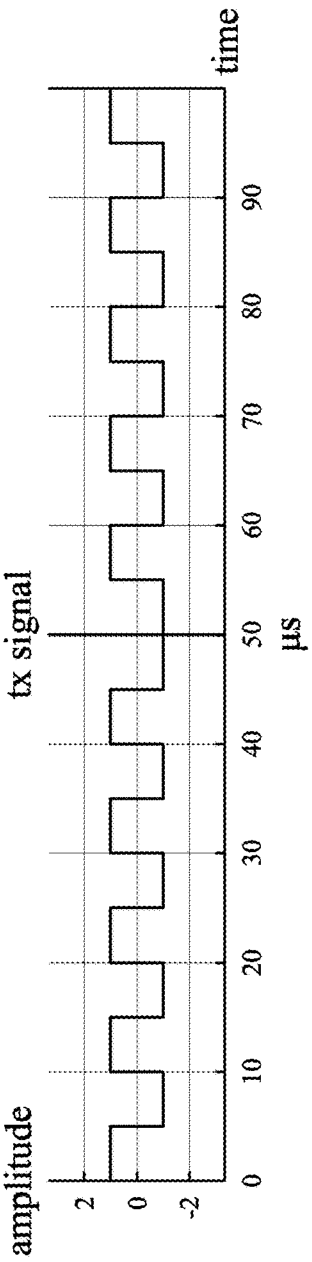
FIG. 7A exemplifies transmitting quadrature +− signals.
Figure 8A:
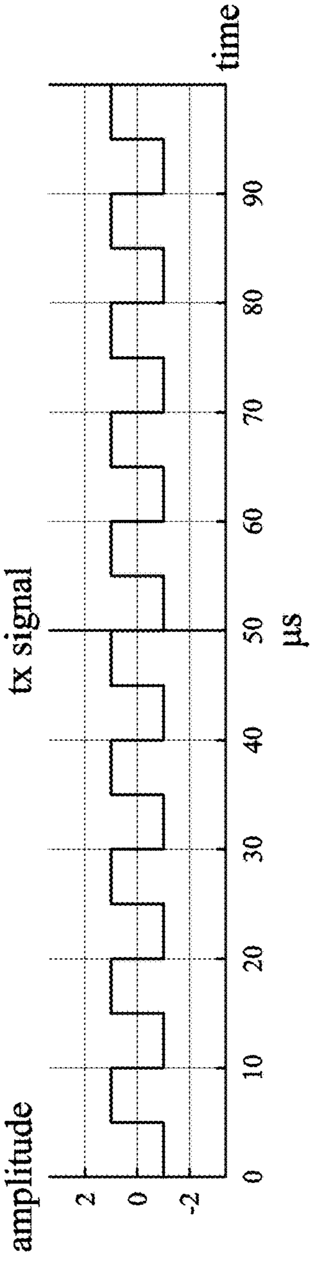
FIG. 8A exemplifies transmitting in-phase −− signals.
Figure 8B:
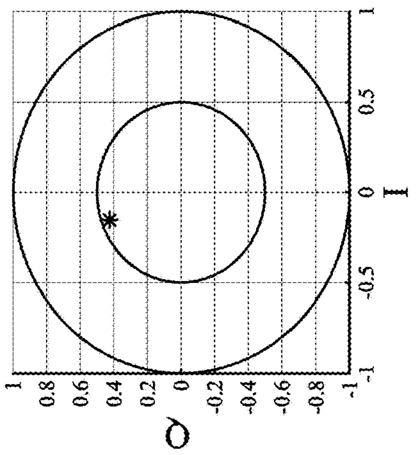
FIG. 8B shows IQ plot of the signals of FIG. 8A.
Figure 9A:
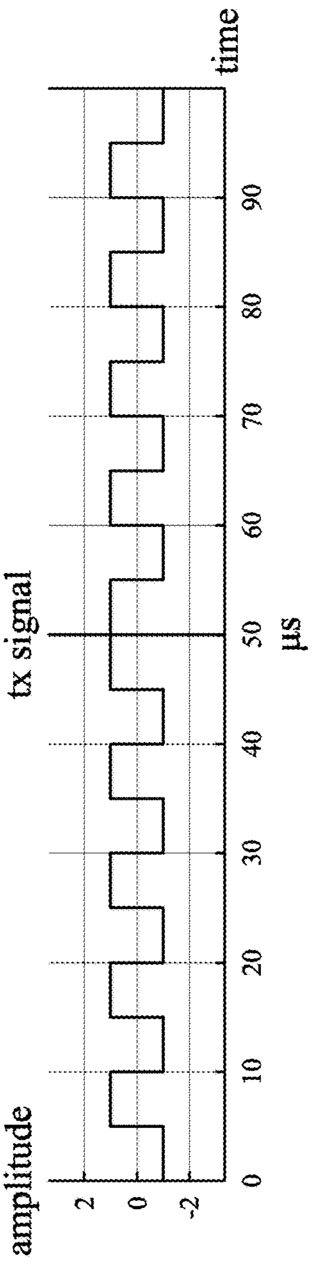
FIG. 9A exemplifies transmitting quadrature −+ signals.
Figure 9B:
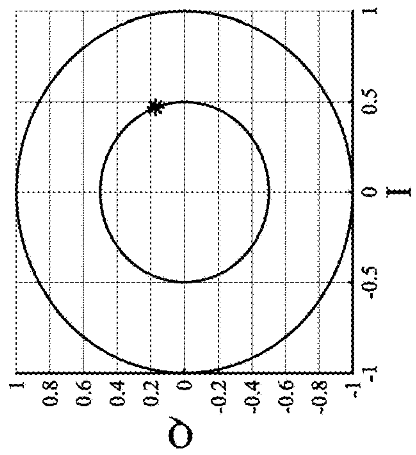
FIG. 9B shows IQ plot of the signals of FIG. 9A.
Figure 10:
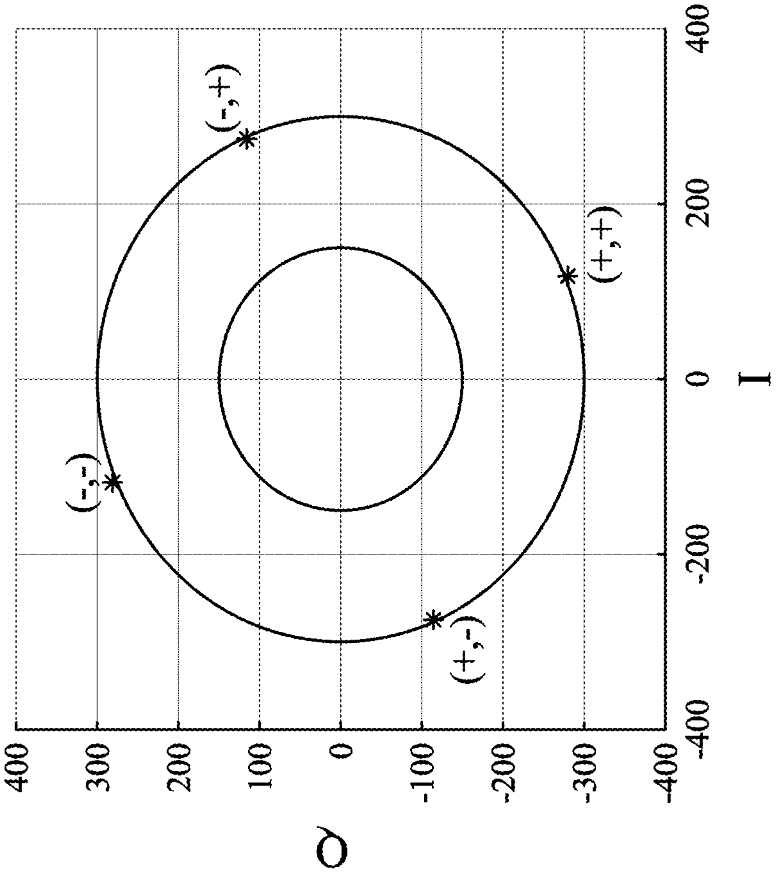
FIG. 10 shows IQ plot of the transmitted signals of FIG. 6A to FIG. 9A.

FIG. 5 shows an exemplary amplitude frequency response, from which the frequency 110 kHz with the largest (or peak) amplitude 35.8666 may be determined as an optimal frequency for touch sensing signal transmission and reception. The determined frequency may be used to decode the sensed signals. FIG. 6A exemplifies transmitting in-phase ++ signals, and FIG. 6B shows IQ plot of the signals of FIG. 6A with x-axis representing the in-phase (I) component, and γ-axis representing the quadrature (Q) component. The distance of a point from the origin represents the amplitude of the signal. Larger distances indicate higher amplitudes. The angle of a point relative to the x-axis represents the phase of the signal. Points along different angles indicate different phases. FIG. 7A exemplifies transmitting quadrature +− signals, and FIG. 7B shows IQ plot of the signals of FIG. 7A. FIG. 8A exemplifies transmitting in-phase −− signals, and FIG. 8B shows IQ plot of the signals of FIG. 8A. FIG. 9A exemplifies transmitting quadrature −+ signals, and FIG. 9B shows IQ plot of the signals of FIG. 9A. As the encoder 113 of the stylus 11 may encode the raw signals by BPSK method as described above, the processor 122 of the touch screen 12 may decode the sensed signals using phase-shift keying (PSK) such as quadrature phase shift keying (QPSK) method as illustrated in FIG. 10, which shows IQ plot of the transmitted signals of FIG. 6A to FIG. 9A.

The stylus 11 may simultaneously transmit multiple touch sensing signals at different frequencies to improve scanning efficiency. These touch sensing signals should have appropriately spaced frequencies so that the shaping device 112 can simultaneously use a larger window function (i.e., left half and right half of the window function combined to result in a wider window function) to shape the raw signals with different frequencies to enhance efficiency and reduce electromagnetic interference from neighboring frequencies, thereby allowing for narrower frequency spacing to improve frequency efficiency.

Although specific embodiments have been illustrated and described, it will be appreciated by those skilled in the art that various modifications may be made without departing from the scope of the present invention, which is intended to be limited solely by the appended claims.

What is claimed is:

1. A touch system, comprising:

a stylus that generates a touch sensing signal, the stylus including a shaping device that sequentially shapes raw signals by only half of a window function a time, thereby generating a windowed signal as the touch sensing signal; and a touch screen coupled to receive the touch sensing signal;

wherein the shaping device sequentially shapes the raw signals by left half of the window function and right half of the window function alternately.

2. The system of claim 1, wherein the touch sensing signal comprises a positioning signal for determining a touch position of the stylus on the touch screen.

3. The system of claim 1, wherein the touch sensing signal comprises an encoding signal for transmitting a feature from the stylus to the touch screen.

4. The system of claim 1, wherein the left half of the window function shaping a first raw signal and the right half of the window function shaping a second raw signal form an entire window function with a width being twice a duration of each raw signal.

5. The system of claim 1, wherein the stylus comprises a signal generator that generates the a raw signal.

6. The system of claim 1, wherein the touch screen comprises touch sensors coupled to receive touch sensing signals, thereby generating sensed signals respectively.

7. The system of claim 6, wherein the touch screen comprises a processor that processes the sensed signals.

8. The system of claim 7, wherein the processor determines a frequency at which the touch sensing signal is received by the touch screen according to an amplitude frequency response.

9. The system of claim 8, wherein a frequency associated with largest amplitude in the amplitude frequency response is determined by the processor for receiving the touch sensing signal.

10. The system of claim 7, wherein the processor decodes the sensed signals using phase-shift keying (PSK).

11. The system of claim 1, wherein the stylus comprises an encoder that encodes a sequence of raw signals by phase shift keying (PSK).

12. The system of claim 1, wherein the stylus transmits multiple touch sensing signals at different frequencies.

* * * * *